United States Patent
Zarri et al.

(10) Patent No.: US 8,913,980 B2
(45) Date of Patent: Dec. 16, 2014

(54) METHOD FOR INDICATING AN EMERGENCY CALL AVAILABILITY TO A MOBILE EQUIPMENT (ME), METHOD FOR ESTABLISHING AN EMERGENCY CALL

(75) Inventors: Michele Zarri, London (GB); Kurt Bischinger, Vienna (AT)

(73) Assignees: T-Mobile International Austria GmbH, Vienna (AT); Deutsche Telekom (UK) Limited, Hertfordshire (GB)

( * ) Notice: Subject to any disclaimer, the term of this patent is extended or adjusted under 35 U.S.C. 154(b) by 231 days.

(21) Appl. No.: 13/577,706

(22) PCT Filed: Feb. 3, 2011

(86) PCT No.: PCT/EP2011/000484
§ 371 (c)(1),
(2), (4) Date: Oct. 22, 2012

(87) PCT Pub. No.: WO2011/098230
PCT Pub. Date: Aug. 18, 2011

(65) Prior Publication Data
US 2013/0052981 A1      Feb. 28, 2013

Related U.S. Application Data

(60) Provisional application No. 61/302,712, filed on Feb. 9, 2010.

(30) Foreign Application Priority Data

Feb. 9, 2010  (EP) ..................................... 10001308

(51) Int. Cl.
*H04W 4/22* (2009.01)
*H04W 76/00* (2009.01)
(52) U.S. Cl.
CPC .............. *H04W 4/22* (2013.01); *H04W 76/007* (2013.01)
USPC ......................... 455/404.1; 455/403; 455/466

(58) Field of Classification Search
CPC .............................. H04W 76/007; H04W 4/22
USPC ........................................ 455/404.1, 403, 466
See application file for complete search history.

(56) References Cited

U.S. PATENT DOCUMENTS

| | | | | |
|---|---|---|---|---|
| 6,125,283 | A * | 9/2000 | Kolev et al. | 455/552.1 |
| 2009/0197572 | A1* | 8/2009 | Feder et al. | 455/411 |
| 2009/0298459 | A1* | 12/2009 | Saini et al. | 455/404.1 |

FOREIGN PATENT DOCUMENTS

| | | |
|---|---|---|
| DE | 102005019340 A1 | 11/2006 |
| EP | 2117263 A1 | 11/2009 |

(Continued)

OTHER PUBLICATIONS

DE102005019340 English translation.*
Universal Mobile Telecommunications System (UMTS); LTE; Service aspects; Service principles (3GPP TS 22.101 version 9.6,0 Release 9), Technical Specification, European Telecommunications Standards Institute (ETSI); France, Jan. 1, 2010, p. 1-58.

(Continued)

*Primary Examiner* — Jinsong Hu
*Assistant Examiner* — Jean Chang
(74) *Attorney, Agent, or Firm* — Leydig, Voit & Mayer, Ltd.

(57) ABSTRACT

A method for indicating an emergency call availability to a Mobile Equipment includes: storing, at a memory device attached to the ME, information regarding the possibility of unauthenticated emergency calls in dependency of availability data, determining that the ME is in a limited service state; and indicating, by the ME, emergency call availability. The availability data indicates, for at least a first mobile telecommunications network and a second mobile telecommunications network, whether: all unauthenticated emergency calls are allowed with or without an identification module inserted in the ME, unauthenticated emergency calls are only allowed if a valid identification module is inserted in the ME, or unauthenticated emergency calls are not allowed.

12 Claims, 1 Drawing Sheet

(56) References Cited

FOREIGN PATENT DOCUMENTS

| WO | WO 9960807 | A1 | 11/1999 |
| WO | WO 2009091573 | A1 | 7/2009 |

OTHER PUBLICATIONS

European Patent Office, International Search Report in International Patent Application No. PCT/EP2011/000484 (May 31, 2011).

* cited by examiner

.US 8,913,980 B2

METHOD FOR INDICATING AN EMERGENCY CALL AVAILABILITY TO A MOBILE EQUIPMENT (ME), METHOD FOR ESTABLISHING AN EMERGENCY CALL

CROSS-REFERENCE TO RELATED APPLICATIONS

This patent application is a national stage entry under 35 U.S.C. §371 of International Application No. PCT/EP2011/000484, filed Feb. 3, 2011, and claims priority to European Patent Application No. EP 10001308.5, filed Feb. 9, 2010, and U.S. Provisional Patent Application No. 61/302,712, filed Feb. 9, 2010. The International Application was published in English on Aug. 18, 2011 as WO 2011/098230.

FIELD

The present invention relates to a method for indicating an emergency call availability to a Mobile Equipment (ME), to a method for establishing an emergency call of a Mobile Equipment (ME), and a program comprising a computer readable program code for providing emergency calls related information to a Mobile Equipment (ME).

BACKGROUND

A Global System of Mobile Communication (GSM) or Universal Mobile Telecommunication System (UMTS) or Evolved Packet System (EPS) mobile device tries to select and register to certain networks in priority order based on certain user and operator settings as specified in 3GPP TS 22.011 (Services and System Aspects; Service Accessibility) and 3GPP TS 23.122 (Core Networks and Terminals; Non-Access-Stratum (NAS) functions related to Mobile Station (MS) in idle mode).

Only mobile devices with valid Subscriber Identity Module (SIM) or Universal Subscriber Identity Module (USIM) inserted are allowed to attempt a registration on the network for Circuit Switched (CS) or Packet Switched (PS) services. Mobile devices which are successfully registered on a network for Packet Switched (PS) services may also attempt to register on an Internet Protocol Multimedia Subsystem (IMS) if available and if equipped with a Universal Subscriber Identity Module (USIM) or with an IMS Subscriber Identity Module (ISIM).

Once registered on a network, the mobile device displays the name of the network as specified in 3GPP TS 22.101 (Services and System Aspects; Service aspect; Service principles). In networks where the name is not broadcast it can be derived from the Mobile Country Code (MCC) and the Mobile Network Code (MNC) which are always broadcast in a radio cell of the network. The numerical value of the Mobile Country Code (MCC) and the Mobile Network Code (MNC) is translated into a name by using a list which is stored in the non-volatile memory of the mobile device or additionally on the Subscriber Identity Module (SIM) or the Universal Subscriber Identity Module (USIM).

If all registration attempts fail, e.g. because they were rejected by the available networks or registration is not possible due to a missing Subscriber Identity Module (SIM) or a missing Universal Subscriber Identity Module (USIM), the mobile device will go to the limited service state, i.e. it selects a certain network based on radio conditions without trying to register on that network.

Under certain conditions, a mobile device might register on a network for Packet Switched (PS) services (e.g. with the Subscriber Identity Module (SIM)) but not being able to register on the Internet Protocol Multimedia Subsystem (IMS) (e.g. due to a missing Universal Subscriber Identity Module (USIM) or a missing IP Multimedia Services Identity Module (ISIM)), which would be necessary to setup emergency calls via the Packet Switched (PS) system.

Emergency calls may be attempted by unregistered mobile devices. Dependent on local regulation there are three different possible scenarios:

all unauthenticated emergency calls are allowed, both in the case where a Subscriber Identity Module (SIM) or a Universal Subscriber Identity Module (USIM) or an IP Multimedia Services Identity Module (ISIM) is not present or invalid and when registration is rejected by the network, e.g. due to the lack of roaming agreement;

unauthenticated emergency calls are only allowed if the mobile device has a Subscriber Identity Module (SIM) or a Universal Subscriber Identity Module (USIM) or a IP Multimedia Services Identity Module (ISIM) inserted;

unauthenticated emergency calls are not allowed at all.

These scenarios are applicable for emergency calls in the Circuit Switched (CS) domain as well as for emergency calls in the Internet Protocol Multimedia Subsystem (IMS) via the Packet Switched (PS) domain.

As discussed, when the mobile device is not successfully registered on the network, it enters the limited service state and the 3GPP specifications prescribe that in this state only emergency call attempts are allowed. Depending on the implementation, the mobile device may display in limited service state either "no service" or a message indicating that only emergency calls are allowed (e.g. "emergency calls only", "SOS"). However this display does not take into account the actual network configuration and regulatory regime of the country where the mobile device is. Therefore, users might try to setup emergency calls repeatedly although it is forbidden or they might not try to do so although it would be possible.

An Internet Protocol Multimedia Subsystem (IMS) capable mobile device being registered on a network for Packet Switched (PS) services only (but not on the Internet Protocol Multimedia Subsystem (IMS)) might just display the network name. However, unauthenticated Internet Protocol Multimedia Subsystem (IMS) emergency calls may not be supported and again the user might be misled to think that emergency calls are supported whereas they are actually not.

Furthermore, as the only criteria for camping on a certain network without registration are radio conditions, the situation may occur in border areas that the mobile device is camping on a network which prohibits unauthenticated emergency calls whereby a different network which would allow those calls would be available as well.

SUMMARY

In an embodiment, the present invention provides a method for indicating an emergency call availability to a Mobile Equipment. The method includes: storing, at a memory device attached to the ME, information regarding the possibility of unauthenticated emergency calls in dependency of availability data; and indicating, by the ME, when the ME is in a limited service state, emergency call availability. The availability data indicates, for at least a first mobile telecommunications network and a second mobile telecommunications network, whether: all unauthenticated emergency calls are allowed with or without an identification module inserted in the ME, unauthenticated emergency calls are only allowed if a valid identification module is inserted in the ME, or unauthenticated emergency calls are not allowed.

DETAILED DESCRIPTION

Figure 1:
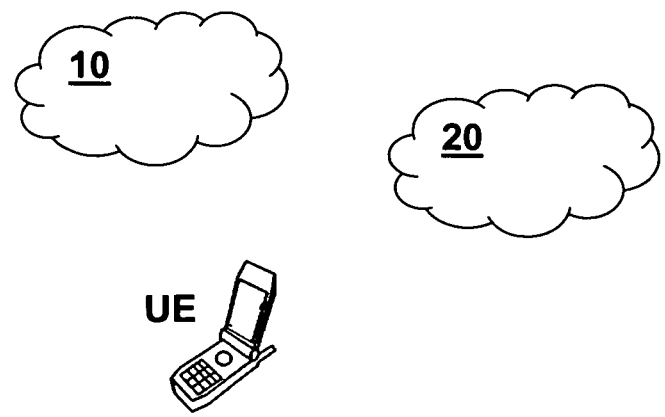
FIG. 1 schematically illustrates a Mobile Equipment (ME)/User Equipment (UE) and a plurality telecommunications networks.

In an embodiment, the present invention is to provides a method for indicating an emergency call availability such that a user is not misled by the information displayed by the Mobile Equipment (ME).

In an embodiment, the present invention provides a method for indicating an emergency call availability to a Mobile Equipment (ME), wherein the Mobile Equipment (ME) comprises information regarding the possibility of unauthenticated emergency calls in dependency of availability data stored in a memory device permanently attached to the Mobile Equipment (ME), the availability data indicating for at least a first mobile telecommunications network and a second mobile telecommunications network whether all unauthenticated emergency calls are allowed with and without an identification module inserted in the Mobile Equipment (ME), unauthenticated emergency calls are only allowed if a valid identification module is inserted in the Mobile Equipment (ME), or unauthenticated emergency calls are not allowed at all, wherein in case that the Mobile Equipment (ME) is in a limited service state, the emergency call availability is indicated by the Mobile Equipment (ME).

According to the present invention, it is thereby advantageously possible that the availability of emergency call functionality is communicated to the user of the mobile device in a more efficient and less misleading way. A further advantage of the present invention is that the communication or indication of the availability of emergency call functionality is independent from the question whether a Subscriber Identity Module (SIM) or a Universal Subscriber Identity Module (USIM) or an IP Multimedia Services Identity Module (ISIM) is inserted in the mobile device or not. This is due to the fact that the availability data are stored in a memory device permanently attached to the Mobile Equipment (ME) which means that the availability data are stored within the Mobile Equipment (ME). Within the context of the present invention, the term "Mobile Equipment" is used either to designate a hardware without an identity module inserted (for the case no identity module is present), or to designate a User Equipment (UE) hardware, i.e. with an identity module inserted (for the case that an identity module is present).

Furthermore, within the context of the present invention, it is to be understood that in case an emergency call is established with or without an identity module, the User Equipment (UE) functionality of the call establishment is referred to even if the term Mobile Equipment (ME) is used.

According to the present invention, it is preferred that the first mobile telecommunications network or the second mobile telecommunications network provide at least a first network service and a second network service, wherein the availability data indicate for the first network service and for the second network service whether all unauthenticated emergency calls are allowed with and without an identification module inserted in the Mobile Equipment (ME), unauthenticated emergency calls are only allowed if a valid identification module is inserted in the Mobile Equipment (ME), or unauthenticated emergency calls are not allowed at all.

It is thereby advantageously possible to enable a still more precise information of the user. The network services (i.e. the first network service and the second network service) include typically a Circuit Switched (CS) service, a Packet Switched (PS) service, and an Internet Protocol Multimedia Subsystem (IMS) service.

According to further preferred embodiments of the present invention, the indication of the emergency call availability is done on request of a user of the Mobile Equipment (ME), and/or the availability data are stored in the memory device within the Mobile Equipment (ME) as a table containing a message to be displayed dependent on the availability of emergency calls.

It is thereby advantageously possible to provide a selective and precise information of the user of a mobile device.

In an embodiment, the present invention provides a method for establishing an emergency call of a Mobile Equipment (ME), wherein the Mobile Equipment (ME) comprises information regarding the possibility of unauthenticated emergency calls in dependency of availability data stored in a memory device permanently attached to the Mobile Equipment (ME), the availability data indicating for at least a first mobile telecommunications network and a second mobile telecommunications network whether all unauthenticated emergency calls are allowed with and without an identification module inserted in the Mobile Equipment (ME), unauthenticated emergency calls are only allowed if a valid identification module is inserted in the Mobile Equipment (ME), or unauthenticated emergency calls are not allowed at all, wherein in case that the Mobile Equipment (ME) is in a limited service state, the emergency call is established in one of the mobile telecommunications networks (10, 20) in dependency of the emergency call availability represented by the availability data.

According to the present invention, it is thereby advantageously possible that emergency calls are placed in a more efficient way.

It is preferred according to the present invention that establishing the emergency call is done on request of a user of the Mobile Equipment (ME), and/or that a reselection procedure is initiated for establishing the emergency call.

Thereby, it is advantageously possible that emergency calls are only placed in case that the user of the mobile device desires such a call and that such a call is always placed if such a call is possible.

The invention further relates to a Mobile Equipment (ME) for indicating an emergency call availability and/or for establishing an emergency call, wherein the Mobile Equipment (ME) comprises a memory device residing in the Mobile equipment part of the Mobile Equipment (ME), and wherein the Mobile Equipment (ME) comprises information regarding the possibility of unauthenticated emergency calls in dependency of availability data stored in the memory device, wherein the availability data indicate for at least a first mobile telecommunications network and a second mobile telecommunications network whether all unauthenticated emergency calls are allowed with and without an identification module inserted in the Mobile Equipment (ME), unauthenticated emergency calls are only allowed if a valid identification module is inserted in the Mobile Equipment (ME), or unauthenticated emergency calls are not allowed at all, wherein the Mobile Equipment (ME) is configured that in case that the Mobile Equipment (ME) is in a limited service state, the emergency call availability is indicated and/or an emergency call is established.

According to the present invention, it is thereby advantageously possible that the availability of emergency call functionality is communicated to the user of the mobile device in a more efficient and less misleading way and that emergency calls are placed in a more efficient way.

It is furthermore preferred according to the present invention that the memory device is a firmware memory in the Mobile Equipment (ME) (i.e. not in the identity module part of the User Equipment (UE)) and/or that the Mobile Equipment (ME) is configured to make possible to update the availability data in the memory device.

Thereby, it is advantageously possible according to the present invention that no identity module (SIM/USIM/ISIM) is required inside the Mobile Equipment (ME) such that no requirements regarding such identity modules or regarding the knowledge of corresponding codes such as PIN (Personal Identification Number) codes are necessary.

An embodiment of the present invention provides a Program comprising a computer readable program code for controlling a Mobile Equipment (ME) to perform a method according to the present invention.

An embodiment of the present invention provides a computer program product comprising a program controlling a Mobile Equipment (ME) as mentioned above.

These and other characteristics, features and advantages of the present invention will become apparent from the following detailed description, taken in conjunction with the accompanying drawings, which illustrate, by way of example, the principles of the invention. The description is given for the sake of example only, The present invention will be described with respect to particular exemplary embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

In FIG. 1, a Mobile Equipment (ME)/User Equipment (UE) and a plurality telecommunications networks, namely a first telecommunications network 10 and a second telecommunications network 20 are schematically illustrated. The Mobile Equipment (ME)/User Equipment (UE) is within the coverage range of both telecommunications networks 10, 20, hereinafter also called networks, such that theoretically, a connection could be established with both networks 10, 20. In the following, the term Mobile Equipment (ME) is used to designate both the case where a hardware without an identity module is meant and the case where a hardware with an identity module is meant. This latter case usually is described by the term User Equipment (UE).

Figure 2:
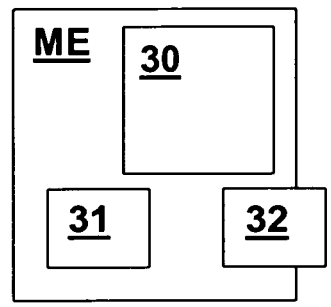
FIG. 2 schematically illustrates a Mobile Equipment (ME)/User Equipment (UE) according to the present invention.

In FIG. 2, the Mobile Equipment (ME) according to the present invention is schematically illustrated. The Mobile Equipment (ME) comprises a display device 30 and a memory device 31. The memory device 31 is fixedly attached to the Mobile Equipment (ME), i.e. the memory device 31 is not of the type of insertable modules 32 such as a Subscriber Identity Module (SIM), a Universal Subscriber Identity Module (USIM), or a IP Multimedia Services Identity Module (ISIM). Preferably, the memory device 31 is a non-volatile memory, e.g. the firmware memory of the Mobile Equipment (ME).

The present invention proposes to avoid the problem initially stated of a user not knowing whether emergency calls are allowed in a situation where the mobile device (or Mobile Equipment (ME)) is camping on a network in a limited service state. Therefore, the invention proposes to introduce availability data, preferably in the form of a table stored in the memory device 31. The availability data indicate for at least the first mobile telecommunications network 10 and the second mobile telecommunications network 20 whether all unauthenticated emergency calls are allowed with and without an identification module inserted in the Mobile Equipment (ME), unauthenticated emergency calls are only allowed if a valid identification module is inserted in the Mobile Equipment (ME), or unauthenticated emergency calls are not allowed at all.

The different networks 10, 20 are represented in the availability data, e.g., by way of their Mobile Country Code (MCC) and Mobile Network Code (MNC) with the associated information if all unauthenticated Circuit Switched (CS) emergency calls are allowed, all unauthenticated Internet Protocol Multimedia Subsystem (IMS) emergency calls via the Packet Switched (PS) system are allowed, only unauthenticated Circuit Switched (CS) emergency calls with a Subscriber Identity Module (SIM)/Universal Subscriber Identity Module (USIM) inserted (into the Mobile Equipment (ME)) are allowed, only unauthenticated Internet Protocol Multimedia Subsystem (IMS) emergency calls with a Universal Subscriber Identity Module (USIM)/IP Multimedia Services Identity Module (ISIM) inserted (into the Mobile Equipment (ME)) are allowed, unauthenticated emergency calls are not allowed at all.

This means that the information about the availability of emergency calls is preferably specifically indicated relative to the different network services, i.e. for a first and a second network service, these availability data can be given separately.

If a mobile device camps on a certain network because it has not been able to register on an allowed network, the availability data can be used to indicate the emergency call availability by the Mobile Equipment, e.g. display a message (preferably on the display device 30) indicating whether emergency calls are possible or not, receive the information if under the current conditions a Circuit Switched (CS) emergency call would be possible, trigger a reselection towards a network that may have been discovered during the scan but discarded because of radio conditions that would allow emergency calls.

If an Internet Protocol Multimedia Subsystem (IMS) capable Mobile Equipment (ME) is registered on a Packet Switched (PS) system only but has not been able to register on an Internet Protocol Multimedia Subsystem (IMS), the availability data can be used to receive the information if under the current conditions an Internet Protocol Multimedia Subsystem (IMS) emergency call would be possible. Subject to the capabilities of the Mobile Equipment (ME) and the information contained in the availability data a message reflecting the actual situation can be displayed, e.g. the name of the network together with the text message "no emergency calls" or only the network name.

The availability data preferably also comprise information about the default messages if no entry can be found for the limited service state. The text of such a message (e.g. "emergency calls only" or "no service") can be set (and localized) when the availability data are provisioned The availability data also comprise information about the default message if no entry can be found in case of being registered on a network for Packet Switched (PS) services but unable to register for Internet Protocol Multimedia Subsystem (IMS). The text of the message (e.g. the network name together with the message "no emergency calls") can be set when the availability data are provisioned.

Preferably, the availability data can be updated over the air by means of remote device management or firmware update.

In case of the availability of several networks for camping, the Mobile Equipment (ME) can use the availability data to prioritize the networks according to the own status. A Mobile Equipment (ME) without Subscriber Identity Module (SIM) or Universal Subscriber Identity Module (USIM) inserted can give higher priority in the network selection process to those networks which allow all unauthenticated emergency calls. A Mobile Equipment (ME) which is not registered to any network but has a Subscriber Identity Module (SIM)/Universal Subscriber Identity Module (USIM) inserted can select both networks which allow unauthenticated emergency calls with or without SIM/USIM with highest priority. If several networks with the same priority are available, the decision which network to camp on is taken based on radio conditions.

The invention claimed is:

1. A method for indicating an emergency call availability to a Mobile Equipment (ME) on a first mobile telecommunications network and on a second mobile telecommunications network, the method comprising:
    storing, at a memory device attached to the ME, availability data regarding the possibility of unauthenticated emergency calls; and
    indicating, by the ME, when the ME is in a limited service state, emergency call availability based on the availability data;
    wherein the first and second mobile telecommunications networks provide a first network service and a second network service to the ME, each of the first and the second network services comprising at least one of the group consisting of: a Circuit Switched (CS) service, a Packet Switched (PS) service, and an Internet Protocol Multimedia Subsystem (IMS) service;
    wherein the availability data indicates, for each of the first network service and the second network service, an emergency calling status from a plurality of emergency calling statuses, the plurality of emergency calling statues including:
        all unauthenticated emergency calls being allowed with or without an identification module inserted in the ME,
        unauthenticated emergency calls only being allowed if a valid identification module is inserted in the ME, and
        unauthenticated emergency calls are not being allowed.

2. The method according to claim 1, wherein indicating the emergency call availability is performed based on a request received from a user of the ME.

3. The method according to claim 1, wherein the availability data are stored in the memory device as a table, wherein the table includes messages to be displayed dependent on the availability of emergency calls.

4. A method for establishing an emergency call for a Mobile Equipment (ME) on a first mobile telecommunications network or on a second mobile telecommunications network, the method comprising:
    storing, at a memory device attached to the ME, availability data regarding the possibility of unauthenticated emergency calls;
    wherein the first and second mobile telecommunications networks provide a first network service and a second network service to the ME, each of the first and the second network services comprising at least one of the group consisting of: a Circuit Switched (CS) service, a Packet Switched (PS) service, and an Internet Protocol Multimedia Subsystem (IMS) service;
    wherein the availability data indicates, for each of the first network service and the second network service, an emergency calling status from a plurality of emergency calling statuses, the plurality of emergency calling statues including:
        all unauthenticated emergency calls being allowed with or without an identification module inserted in the ME,
        unauthenticated emergency calls only being allowed if a valid identification module is inserted in the ME, and
        unauthenticated emergency calls not being allowed; and
    establishing, by the ME, when the ME is in a limited service state, the emergency call on the first mobile telecommunications network or the second mobile telecommunications network based on the availability data.

5. The method according to claim 4, wherein establishing the emergency call is performed based on a request received from a user of the ME.

6. The method according to claim 4, wherein a reselection procedure is initiated for establishing the emergency call.

7. A Mobile Equipment (ME), comprising:
    a memory device attached to the ME, configured to store availability data regarding the possibility of unauthenticated emergency calls;
    wherein first and second mobile telecommunications networks provide a first network service and a second network service to the ME, each of the first and the second network services comprising at least one of the group consisting of: a Circuit Switched (CS) service, a Packet Switched (PS) service, and an Internet Protocol Multimedia Subsystem (IMS) service;
    wherein the availability data indicates, for each of the first network service and the second network service, an emergency calling status from a plurality of emergency calling statuses, the plurality of emergency calling statues including:
        all unauthenticated emergency calls being allowed with or without an identification module inserted in the ME, unauthenticated emergency calls only being allowed if a valid identification module is inserted in the ME, and unauthenticated emergency calls not being allowed; and a processor, configured to indicate, when the ME is in a limited service state, emergency call availability based on the availability data.

8. The ME according to claim 7, wherein the memory device is a firmware memory.

9. The ME according to claim 7, wherein the processor is further configured to update the availability stored data in the memory device.

10. A Mobile Equipment (ME), comprising:

a memory device attached to the ME, configured to store availability data regarding the possibility of unauthenticated emergency calls;

wherein first and second mobile telecommunications networks provide a first network service and a second network service to the ME, each of the first and the second network services comprising at least one of the group consisting of: a Circuit Switched (CS) service, a Packet Switched (PS) service, and an Internet Protocol Multimedia Subsystem (IMS) service;

wherein the availability data indicates, for each of the first network service and the second network service, an emergency calling status from a plurality of emergency calling statuses, the plurality of emergency calling statues including:

all unauthenticated emergency calls being allowed with or without an identification module inserted in the ME, unauthenticated emergency calls only being allowed if a valid identification module is inserted in the ME, and unauthenticated emergency calls not being allowed; and a processor, configured to establish, when the ME is in a limited service state, the emergency call in one of the first mobile telecommunications network and the second mobile telecommunications network based on the availability data.

11. A tangible, non-transitory computer-readable medium having compute-executable instructions stored thereon for indicating an emergency call availability to a Mobile Equipment (ME) on a first mobile telecommunications network and on a second mobile telecommunications network, the computer-executable instructions, when executed by a processor, causing the following steps to be performed:

storing, at a memory device attached to the ME, availability data regarding the possibility of unauthenticated emergency calls; and indicating, when the ME is in a limited service state, emergency call availability based on the availability data;

wherein the first and second mobile telecommunications networks provide a first network service and a second network service to the ME, each of the first and the second network services comprising at least one of the group consisting of: a Circuit Switched (CS) service, a Packet Switched (PS) service, and an Internet Protocol Multimedia Subsystem (IMS) service;

wherein the availability data indicates, for each of the first network service and the second network service, an emergency calling status from a plurality of emergency calling statuses, the plurality of emergency calling statues including:

all unauthenticated emergency calls being allowed with or without an identification module inserted in the ME, unauthenticated emergency calls only being allowed if a valid identification module is inserted in the ME, and unauthenticated emergency calls not being allowed.

12. A tangible, non-transitory computer-readable medium having computer-executable instructions stored thereon for establishing an emergency call for a Mobile Equipment (ME) on a first mobile telecommunications network or on a second mobile telecommunications network, the computer-executable instructions, when executed by a processor, causing the following steps to be performed:

storing, at a memory device attached to the ME, availability data regarding the possibility of unauthenticated emergency calls;

wherein the first and second mobile telecommunications networks provide a first network service and a second network service to the ME, each of the first and the second network services comprising at least one of the group consisting of: a Circuit Switched (CS) service, a Packet Switched (PS) service, and an Internet Protocol Multimedia Subsystem (IMS) service;

wherein the availability data indicates, for each of the first network service and the second network service, an emergency calling status from a plurality of emergency calling statuses, the plurality of emergency calling statues including:

all unauthenticated emergency calls being allowed with or without an identification module inserted in the ME, unauthenticated emergency calls only being allowed if a valid identification module is inserted in the ME, and unauthenticated emergency calls not being allowed; and establishing, when the ME is in a limited service state, the emergency call on the first mobile telecommunications network or the second mobile telecommunications network based on the availability data.

\* \* \* \* \*